Sept. 2, 1958     M. M. MALEC     2,849,800
DISTANCE MEASURING APPARATUS
Filed May 3, 1955
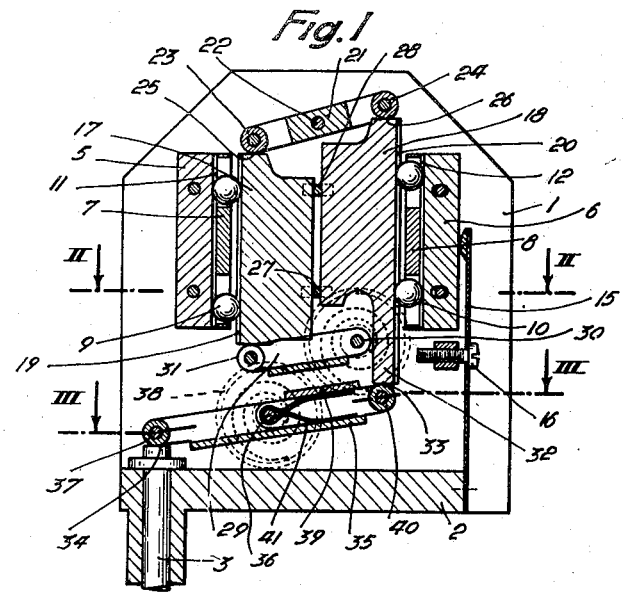
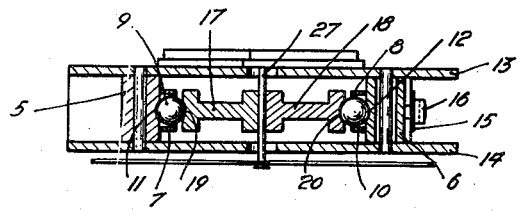
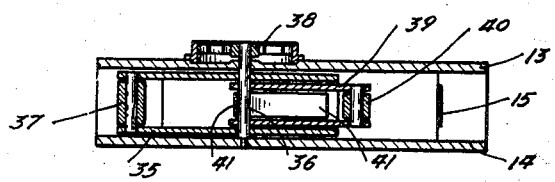
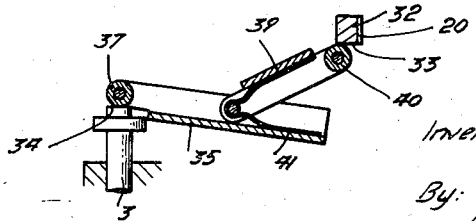
Inventor:
Michel M. Malec
By: Leonard S. Kleinfeld
His attorney United States Patent Office 2,849,800
Patented Sept. 2, 1958

2,849,800

DISTANCE MEASURING APPARATUS

Michel M. Malec, Levallois-Perret, France

Application May 3, 1955, Serial No. 505,807

Claims priority, application France May 7, 1954

3 Claims. (Cl. 33—172)

My invention relates to improvements in precision measuring apparatus such as comparators, reference gauges, calipers and other similar instruments, of the type in which the movement of the gauging finger is transmitted to indicating members by kinematic displacement amplifiers.

It has already been proposed to transmit the movement of the gauging finger to the indicating member or members through bearing means comprising, in particular, slides and rollers, the indicating members or index being keyed on the last rollers to receive the movement or on intermediate members.

More especially, it has been proposed to grip the roller or rollers or needles carrying the indicating members, or index, between two slides moving in opposite directions and pulled or pushed towards each other by resiliently deformable means and guided by balls or rollers, one of the slides being subjected to the action of a drawback spring and the other being connected to the gauging finger.

In certain embodiments of this type of apparatus a kinematic connection is provided between the slides by means of a beam of which the centre bears against an intermediate knife-edge, the beam also being made to bear against the two slides by means of knife-edges. In these embodiments any lateral movement of the slides causes an error in measurement; it follows that the precision of the apparatus is reduced by any irregularity in manufacture, particularly by any difference in the diameter of the balls or rollers on which the said slides move.

It is among the objects of the invention to provide an apparatus of this type in which any lateral displacement of the slides has no effect whatever on the precision of measurement and to ensure a constant, predetermined pressure of application, preferably adjustable, of one slide against the other, whatever may be the respective positions of the two slides.

It is another object of the invention to provide a special device between the gauging finger or the rod directly connected to the finger, and that one of the two slides which is not directly subjected to the action of a drawback spring, the said device being so arranged that all the parts are kept in contact and the play is automatically taken up, whereby normal operation of the machine is ensured, whatever may be the force brought to bear on the gauging finger.

These and other objects and advantages of the invention will be apparent to those skilled in the art from a consideration of the following detailed description in conjunction with the accompanying drawings in which:

Fig. 1 is a front view, in diametral section, of a specimen embodiment of a measuring apparatus with slides, the gauging finger being out;

Fig. 2 is a cross-section along the line II—II of Fig. 1;

Fig. 3 is a cross-section along the line III—III of Fig. 1; and

Fig. 4 is a partial view showing the arms of the shock-absorbing device in the open position brought about by the sudden exercise of force on the gauging finger.

In the specimen embodiment shown in Figs. 1 to 4, the measuring apparatus as a general casing 1 inside which are housed, in particular, a base plate 2 serving to guide a rod 3 of which the outside end is fitted with a gauging finger. On a supporting part 5 fixed to the casing 1 and a horizontally movable part 6, balls 9, 10 run, which in this instance are held in cages 7, 8, a race 11, 12 respectively being machined on the corresponding surface of the parts 5, 6 to guide the balls 9, 10. The part 5 is fixed to the platens 13, 14, and the other part 6, is adjusted between the two platens in such a way as to be able to slide horizontally and is resiliently urged towards the other part 5, by a spring 15 fixed to the base plate 2 and provided with a tightening screw 16. Between the ball cages 7 and 8 are mounted two slides 17, 18 which can move in translation parallel to the plane of the surfaces of the parts 5, 6, and which have grooves 19, 20 serving as race for the balls 9, 10, the said slides 17, 18 not having any contact with the front platen 14 and rear platen 13. Kinematic connection between the slides 17 and 18 is made by an arm 21 swivelling round a fixed shaft 22 fitted at its ends with two small identical rollers 23, 24 symmetrical in relation to the shaft 22, which rollers co-operate with plane and parallel contact surfaces 25 and 26 respectively, provided on the slides 17 and 18 so that the slides must necessarily executive a movement of translation in opposite directions. Between the two slides 17 and 18 are tightly held two perfectly round needles 27, 28, the shaft ends of which fit into horizontal grooves in the platens of the apparatus. The slide 17 is constantly subjected to the action of a restoring force through an arm 29 mounted so as to swivel round the spindle 30 integral with the end of a spiral spring. The end of the arm 29 carries a roller 31 which pushes against a plane surface of the slide 17. The slide 18 has a tail 32 with a plane end 33 connected to the plane end 34 of the rod 3 through a system of levers constituted by a swivelling arm 35 mounted on a shaft 36 the end of which carries a roller 37 co-operating with the plane end 34 of the rod 3 and urged towards the said rod by a spiral spring 38 of greater strength than the spiral spring mounted on the shaft 30. This arm 35 is a U-section member inside which a second swivelling arm 39 can move, the said arm being also mounted on the shaft 36 and being constituted also by a U-section member the concavity of which is turned toward that of the U-section member 35 and which can push against it. The end of the arm 39 carries a roller 40 co-operating with the plane surface 33 of the slide 18. A hairpin spring 41, the strength of which is greater than the weight of the slide 18, constantly tends to hold the arm 39 away from the arm 35, that is to say, to open the hinge they form and to hold the slide 18 in contact with the swivelling arm 21.

The apparatus which has just been described works as follows:

When at rest with the gauging finger out, that is to say in the position shown in Fig. 1, the arm 35, under the action of the spring 38, holds the roller 37 in contact with the end 34 of the rod 3 and, flattening the spring 41, causes the arm 39 to bear against the plane end 33 of the tail 32 of the slide 18, through its roller 40. The slide 18 is raised and consequently the slide 17 is lowered and the arm 29 is forced downwardly against the action of the drum spring fitted on the shaft 30, the force of which is less than that of the spring 38. When the gauging finger and its rod 3 are pressed in to measure a thickness, the arm 35 swivels clockwise round its shaft 36. But the action of the spring fitted on the shaft 30 makes the arm 29 swivel clockwise, and this movement is transmitted by the roller 31 to the slide 17 which undergoes a vertical translational movement upwards on the balls 9. This movement, in turn, is positively transmitted to the slide 18 by the roller 23 of the arm 21, which swivels round the shaft 22 and by the roller 24 bearing downwardly on the slide 18. The action of the tail 32 on the roller 40 holds the arm 39 in place against the arm 35, overcoming the tension of the spring 41. It is therefore seen that any normal displacement of the gauging finger while a measurement is being taken brings about two translational movements, in opposite directions but of the same magnitude, of the two slides 17 and 18, and therefore a rotation without slip of the needle 27 round its axis, which remains fixed in space, the said needle being held tightly between the two slides with a predetermined, adjustable and constant pressure, due to the provision of the balls 9 and 10 on either side and of the adjustable spring 15. A brake can be provided on the shaft of the second needle 28, so as to avoid any sudden and unexpected movements of the moving members of the apparatus.

If a sudden force is exerted on the gauging finger, it simply causes the arm 35 to rotate rapidly clockwise about the shaft 35 and the angle formed by the arm 36 and the arm 39 to open under urging of the spring 41, without the said force being transmitted to the other members of the apparatus and being likely to damage it.

Although there is described but a single embodiment of this invention, it will be obvious to those skilled in the art that various modifications may be made in the details of construction without departing from the principles herein set forth. It will be further obvious that certain features of the invention may be omitted in any given construction without altering the other desirable features.

What I claim is:

1. In a measuring instrument of the type wherein translational movement of an input member is converted into rotational movement of an index the combination comprising a framework, a pair of slides supported on said framework for translational movement in opposite directions along parallel paths, the two slides having mutually opposed, spaced-apart plane surfaces, a pair of slotted bearings on said framework the axis whereof is normal to said paths, a spindle rotatably supported in said bearings interposed between said surfaces and frictionally gripped therebetween whereby movement of said slides is converted into rotation of said spindle, a second pair of slotted bearings, an idler spindle rotatably supported in said second bearings and also frictionally held between said surfaces, said idler spindle being spaced from said first spindle, means for biasing at least one of said slides in a direction normal to said paths to provide rolling friction on said spindles, an index carried on said first spindle, a pivoted rocker at one common end of said slides and having a roller at each extremity thereof abutting said ends for transmitting translational movement of either slide to the other, a second rocker positioned adjacent the other common end of said slides, one extremity of said second rocker having a roller abutting the input member and the other extremity thereof having a roller abutting said second common end of one of said slides, bias means for maintaining abutment of the rollers of said second rocker, a pivoted arm having a roller at its distal end abutting the said second common end of said other slide, bias means for maintaining abutment of said last roller, the axes of the said two rockers and said arm being parallel to each other and normal to the direction of translational movement of the slides, the areas of abutment of the slides with their respective rollers being plane surfaces parallel to said axes, and the pivotal axis of said first rocker being equidistant from the points of abutment of said first rocker rollers.

2. The combination in accordance with claim 1 wherein said second rocker comprises two parts, one constituting one leg of the rocker and the other part constituting the other leg thereof, said legs being independently pivoted on the axis of the rocker, spring means interconnecting said parts having a spring constant such, that during normal operation of the instrument, the rollers of said second rocker arm are maintained in their abutting relation and whereby, upon application of abnormal force to the input member said parts may independently pivot to relieve the slides of shock.

3. In a measuring instrument of the type wherein translational movement of an input member is converted into rotational movement of an index the combination comprising a framework, a pair of slides supported on said framework for translational movement in opposite directions along parallel paths, the two slides having mutually opposed, spaced-apart plane surfaces, a pair of slotted bearings on said framework the axis whereof is normal to said paths, a spindle rotatably supported in said bearings interposed between said surfaces and frictionally gripped therebetween whereby movement of said slides is converted into rotation of said spindle, a second pair of slotted bearings, an idler spindle rotatably supported in said second bearings and also frictionally held between said surfaces, said idler spindle being spaced from said first spindle, means for biasing at least one of said slides in a direction normal to said paths to provide rolling friction on said spindles, an index carried on said first spindle, a pivoted rocker at one common end of said slides and having a roller at each extremity thereof abutting said ends for transmitting translational movement of either slide to the other, means for connecting the input member to one of said slides, bias means for maintaining said slides and rollers in abutment, the respective axes of said rollers being parallel to each other and both normal to the direction of translational movement of the slides, the surfaces of said slides upon which said rollers abut being plane and parallel to the pivotal axis of said rocker and said axis being equidistant from the lines of abutment of said rollers.

References Cited in the file of this patent

UNITED STATES PATENTS

| 1,006,924 | Erb _____ | Oct. 24, 1911 |
| 1,729,466 | Whittemore _____ | Sept. 24, 1929 |
| 1,842,502 | Blomquist _____ | Jan. 26, 1932 |
| 2,493,313 | Rabe _____ | Jan. 3, 1950 |

FOREIGN PATENTS

| 732,515 | Germany _____ | Mar. 4, 1943 |
| 642,723 | Great Britain _____ | Sept. 13, 1950 |
| 976,052 | France _____ | Oct. 25, 1950 |